United States Patent [19]

Roberts

[11] 4,446,165

[45] May 1, 1984

[54] OLEAGINOUS COMPOSITIONS

[75] Inventor: Bruce A. Roberts, Goshen, Ohio

[73] Assignee: The Procter & Gamble Company, Cincinnati, Ohio

[21] Appl. No.: 313,063

[22] Filed: Oct. 19, 1981

Related U.S. Application Data

[63] Continuation of Ser. No. 46,886, Jun. 8, 1979, abandoned.

[51] Int. Cl.³ .......................... A23D 5/00; A23D 3/00
[52] U.S. Cl. ................................ 426/602; 426/604; 252/310; 252/312
[58] Field of Search ............... 426/573, 575, 576, 601, 426/602, 603, 604, 607, 606, 611, 654; 252/315, 316, 310, 312

[56] References Cited

U.S. PATENT DOCUMENTS

| | | | |
|---|---|---|---|
| 3,248,229 | 4/1966 | Pader et al. | 426/98 |
| 3,360,377 | 12/1967 | Spitzer et al. | 426/604 |
| 3,360,378 | 12/1967 | Spitzer et al. | 426/604 |
| 3,528,823 | 9/1970 | Rossen | 426/606 |
| 3,549,383 | 12/1970 | Menzies | 426/606 X |
| 3,751,265 | 8/1973 | Seiden | 426/606 X |
| 3,752,770 | 8/1973 | Buddemeyer | 426/654 X |
| 4,103,037 | 7/1978 | Bodor et al. | 426/575 |
| 4,115,598 | 9/1978 | Moran | 426/604 |
| 4,234,606 | 11/1980 | Gawrilow | 426/606 X |

FOREIGN PATENT DOCUMENTS

698660 11/1964 Canada ................................. 426/606

*Primary Examiner*—Robert A. Yoncoskie
*Attorney, Agent, or Firm*—Jerry J. Yetter; Eric W. Guttag; Richard C. Witte

[57] ABSTRACT

Stable emulsions characterized by pseudo-"melting" properties are comprised of an oil phase, an aqueous disperse phase, and particles containing an immobilized water-in-oil emulsion destabilizing agent. The emulsions are suitable for use as drug delivery vehicles, cosmetic ointments, and the like, and especially as foods, such as cake frosting bases, desserts ("ice cream") and bread spreads. The physical and organoleptic properties of the emulsions make them especially useful as successors to butter or margarine. In an optional mode, compositions comprising the oil phase and the destabilizing agent are provided. Such compositions interact with extrinsic water (e.g., saliva) and provide palatable, non-waxy shortenings, food spreads, and the like. When used for frying foods, or the like, the water-containing compositions herein foam slightly, and this foaming reduces both spattering and the tendency of food being cooked to undesirably adhere to the cooking utensil.

27 Claims, 2 Drawing Figures

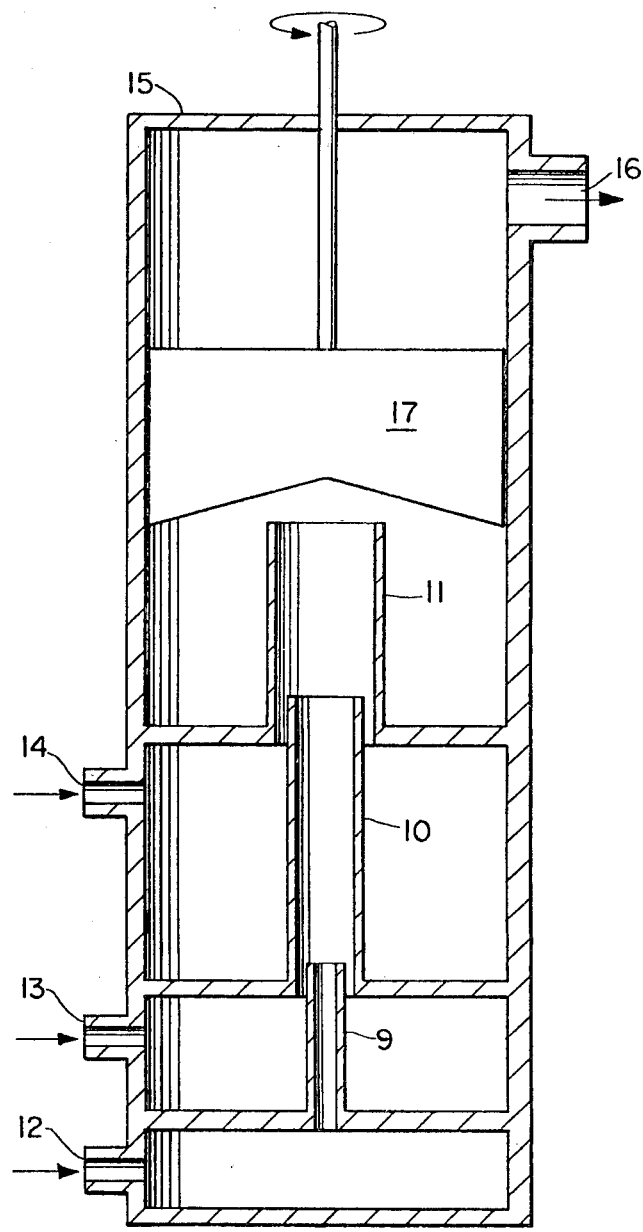

OLEAGINOUS COMPOSITIONS

This is a continuation of application Ser. No. 46,886, filed June 8, 1979, now abandoned.

TECHNICAL FIELD

The present invention encompasses compositions which are characterized by pseudo-"melting" properties. The compositions herein are suitable for various purposes, including as drug delivery vehicles, cosmetic ointments, and the like. The compositions are especially foods, such as cake frosting bases, desserts ("ice cream") and especially as bread spreads which can be flavored as desired by the formulator. The physical and organoleptic properties of the compositions herein make them especially useful as successors to butter or margarine.

Butters and margarines have similar morphologies and functions. Both are water-in-oil (W/O) emulsions stabilized primarily by solid fat crystals. As soon as the solid fat crystals melt, butter and margarine lose their W/O structure and split into an oil phase containing oil-in-water (O/W) emulsifier, and a separate aqueous phase. In the presence of water or mouth saliva, the melted butter or margarine emulsifies into an O/W emulsion. The temperature in the mouth initiates the formation of the O/W emulsion. (This is one reason why butter and margarine must be stored under refrigeration.) This W/O to O/W conversion is perceived, in the mouth, as a necessary aspect of melting ("pseudo-melting"). The conversion to the O/W emulsion form of butter and margarines is also probably necessary for release of flavor.

The problems with butter and margarine include: spreadability on bread, frying pan residue after cooking, spattering during frying, syneresis, and the like. Moreover, butter and margarine begin to melt at room temperature, and must be refrigerated to prevent slumping. Some margarines contain high melting fats to help prevent slumping, but such products have a characteristic waxy feel. Waxiness is an indication that such products are not melting, and without melting (loss of crystal lattice structure) such products do not become an O/W emulsion. Synthetic butter or margarine products which feel waxy in the mouth are generally perceived to be of low quality and are unacceptable to most users.

The present invention employs a combination of emulsion stabilizing agents and emulsion destabilizing agents to invert W/O emulsions to O/W emulsions in use, thereby providing a kind of pseudo-melting. Compositions prepared in the manner of this invention are heat-stable, yet non-waxy. The compositions herein have additional advantages over butter, butter substitutes or margarines, as disclosed hereinafter.

BACKGROUND ART

U.S. Pat. No. 4,115,598 (Sept. 17, 1978) relates to water-in-oil type emulsions containing a specified blend of fats, and also containing monoglycerides and oil-in-water emulsion promoting emulsifiers. The patentees state that the emulsion destabilizes at body temperature.

U.S. Pat. No. 2,007,218 (July 9, 1935) discloses and claims the stabilization of emulsified food products with various gums.

U.S. Pat. No. 3,663,235 (May 16, 1972) discloses aqueous fat emulsions containing certain diacylglycerol phosphatides. The patentees disclose that margarine is made by phase-inversion of the disclosed oil-in-water emulsions of high fat content.

U.S. Pat. No. 3,939,282 (Feb. 17, 1976) discloses margarine and low fat emulsion food spreads wherein the fat phase is randomized palm oil. The patentees state that the randomization minimizes post-hardening effects and also minimizes the amount of sunflower oil which has been used with palm oil in such products.

U.S. Pat. No. 3,360,377 (Dec. 26, 1967) discloses a method for the production of low-calorie margarine substitute products. U.S. Pat. No. 3,360,378 (Dec. 26, 1967) discloses a stable, plastic, edible margarine substitute composition consisting essentially of at least 45% by weight of water and from 20 to 55% oleaginous ingredients consisting essentially of an edible oil as the predominant oleaginous material and an emulsifying system.

U.S. Pat. No. 3,457,086 (July 22, 1969) discloses low-fat table spreads which are substantially free of protein, contain less than 50% fat, and are stable water-in-oil emulsions.

U.S. Pat. No. 3,490,919 (Jan. 20, 1970) discloses emulsions of edible fats, such as margarines, having a semi-solid plastic fat as a continuous phase and a stabilized dispersion of liquid oil in an aqueous medium as the disperse phase. Patentees teach that stabilization is preferably affected by incorporation of a protective colloid within the aqueous phase.

U.S. Pat. No. 3,425,842 (Feb. 4, 1969) discloses a food spread containing milk solids, water and an oleaginous gel. The disclosed food spreads are said to be useful as margarine compositions which are spreadable at both refrigeration and room temperatures.

U.S. Pat. No. 4,051,269 (Sept. 27, 1977) relates to low calorie, high protein, edible water-in-oil emulsions as margarine-like table spreads.

U.S. Pat. No. 4,071,634 (Jan. 31, 1978) relates to water-in-oil type low fat spreads whose oil phase is a fat blend plastic at room temperature and whose aqueous phase contains phosphatides, proteinaceous ingredients and dispersed fat.

U.S. Pat. No. 4,103,037 (July 25, 1978) discloses proteinaceous low fat spreads stabilized by means of a gelling agent.

R. L. Hawley reports (FOOD PRODUCT DEVELOPMENT, November, 1977) the formulation of margarine-type products with soy protein.

The non-absorbable polyol polyesters which can be used in the cholesterol-lowering compositions disclosed herein are described in U.S. Pat. No. 3,600,186 (Aug. 17, 1971) the disclosures of which are incorporated herein by reference. Example 7 of U.S. Pat. No. 3,600,186 describes the use of sucrose octaoleate (the most highly preferred cholesterol-lowering polyol polyester) in a margarine composition.

U.S. Pat. Nos. 4,034,083 (1977) to Mattson, 4,005,195 (1977) to Jandacek, and 4,005,196 (1977) to Jandacek and Mattson, incorporated herein by reference, disclose various combinations of polyol polyesters with anti-anal leakage agents and vitamins. Such compositions can also be used in the cholesterol-lowering compositions made in the manner of the present invention.

U.S. Pat. No. 2,962,419 (1960) to Minich, incorporated herein by reference, discloses neopentyl fatty materials which can be used in the present compositions.

DISCLOSURE OF INVENTION

The present invention encompasses compositions of matter, comprising: (I) from about 25% to about 95% by weight of composition of an oil phase, said oil phase being selected from the group consisting of: (i) solid fats or solidified oils, and (ii) liquid oils containing at least about 0.5% by weight of the liquid oil of a water-in-oil emulsion stabilizing agent, said oil phase having substantially homogeneously distributed therethrough; (II) an optical aqueous disperse phase, said aqueous disperse phase comprising from about 0% to about 75% by weight of the total composition; said composition having dispersed therethrough particles comprising an immobilized water-in-oil emulsion destabilizing agent (III) characterized by a hydrophilic-lipophilic balance (HLB) greater than about 6.

The oil phase (I) of the present compositions can comprise a variety of digestible glyceride fats and oils, as described more fully hereinafter. The oil phase can also comprise various non-digestible materials, including those which provide low calories and anti-hypercholesterolemic benefits, also as described more fully hereinafter.

Preferred compositions herein have an aqueous disperse phase (II) in the form of gel droplets which are distributed substantially homogeneously throughout said composition. Highly preferred compositions herein are those wherein the gelled aqueous disperse phase comprises a chemically-set gelling agent and water. The alginates, especially sodium alginate, are the preferred chemically-set gelling agents used herein. In a typical "butter-type" composition the disperse phase comprises an aliginate gel in the form of discrete droplets having an average particle size in the general range from about 1 micron to about 30 microns, said gel particles being substantially homogeneously distributed throughout the composition.

Shortening-type compositions herein comprise the oil phase (I) and the destabilizing agent (III). Such compositions interact with water which is extrinsic to the composition, such as saliva or the like, and "melt" without waxiness or greasiness.

Preferred compositions herein are those wherein the water-in-oil emulsion destabilizing agent (III) is selected from the group consisting of nonionic and anionic surfactants, especially those having an HLB of at least about 12. The destabilizing agent is preferably encapsulated, but can also be in the form of a high viscosity or solid particle. The important consideration is to maintain the destabilizing agent in a passive state until time-of-use, when it is released within the composition by heat, moisture (e.g., saliva), electrolytes, pH, and/or shear forces, (e.g., mastication).

In use, the compositions herein come under compressional or shearing forces (e.g., by spreading on an edible substrate such as bread, during mastication, or by rubbing onto skin) and/or heat in the presence of external moisture and under the influence of pH changes and/or electrolytes. These forces (or heat) cause the water-in-oil emulsion destabilizing agent (III) to be released, coming in contact with the continuous oil phase, and then, in the presence of external moisture, the emulsion becomes water continuous and pseudo-melting occurs without waxiness. In particular, the co-presence of electrolyte with the immobilized destabilizing agent (III) promotes the release (or mobilization) of (III) to allow it to perform its destabilizing function. For example, common salt (NaCl) promotes the release of (III) and is conveniently used in the compositions disclosed herein.

All percentages and parts herein are by weight, unless otherwise stated.

DESCRIPTION OF DRAWINGS

FIG. 2 herein depicts the Interfacial Reactor (IFR) 1 as used in the process shown in FIG. 1. The preferred IFR used herein simply comprises a nested series of hypodermic-type needles 9, 10 and 11, or the like, nested in a substantially coaxial configuration and fitted with individual inlet ports 12, 13 and 14 through which chemical reactants can flow. The nested series of needles is contained within a suitable container 15 fitted with product exit port 16. A high shear mixing head 17 is assembled above the needles, as shown in FIG. 2. Dimensionally, needle 9 of the Figure can be, for example, size BD 21 (0.46 mm ID), needle 10 is, for example, size BD 17 (0.99 mm ID) and needle 11 is, for example, BD-13 (1.78 mm ID). Inlet port 12 communicates with needle 9; inlet port 13 communicates with needle 10; and inlet port 14 communicates with needle 11. In use, gelling agent ($b_2$) is introduced into inlet port 12 at a rate of about 17 lbs. per hr., whereupon $b_2$ moves upwardly through needle 9. The gelling chemicals $b_3$ are introduced into inlet port 13 at a rate of about 1.0 lbs. per hr., whereupon, as they move through needle 10, they are contacted with gelling agent $b_2$ and the mixture proceeds upwardly into needle 11. Concurrently, ingredient $a_1$ is introduced into inlet port 14 at a rate of about 12 lbs. per hr. and moves upwardly into needle 11, whereupon $a_1$ is contacted with the mixture of $b_2$ and $b_3$ which are concurrently moving upward through needle 10. The total mix of $a_1$, $b_2$, and $b_3$ is then forced upwardly through needle 11, whereupon contact is made with the high shear mixing head 17. After passing beyond the high shear mixing head, the product exits the IFR through exit port 16.

BEST MODE

Figure 1:
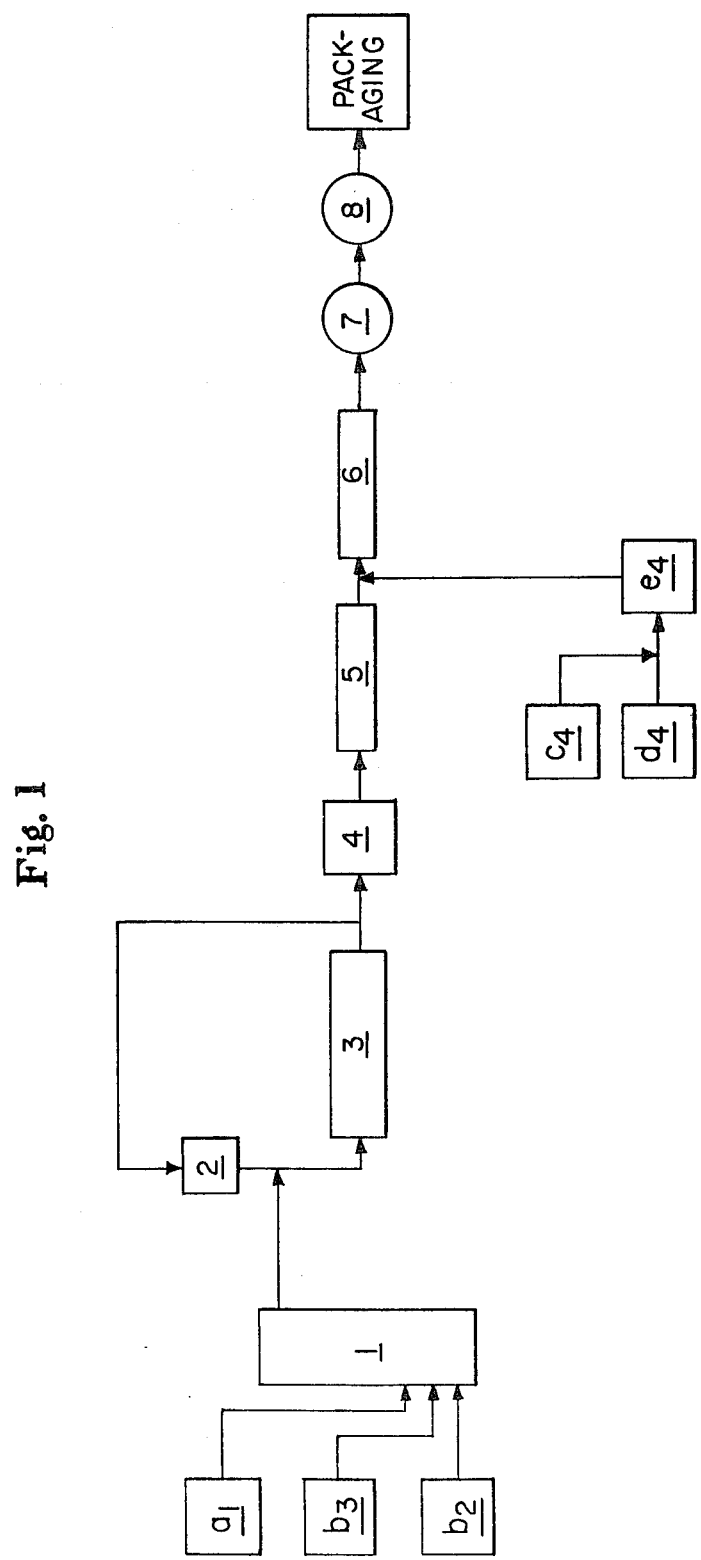
FIG. 1 is a process flow scheme for the preparation of emulsion-type compositions as disclosed herein. Processing temperatures are noted in parentheses. The compositions comprising the various ingredient streams $a_1$, $b_2$, $b_3$, $c_4$, $d_4$, and $e_4$ are disclosed more fully hereinafter. In the process, ingredients $a_1$ (43° C.), $b_2$ (29° C.) and $b_3$ (23° C.) are mixed in the Interfacial Reactor 1. The stream (38° C.) then moves to homogenizer 3, which is fitted with a recycle surge/cooler 2 and pressure relief surge tank 4. The mixture then moves into the motionless mixer/cooler 5. Components $c_4$ (30° C.) and $d_4$ (30° C.) are separately blended to provide composition $e_4$ (30° C.), which is introduced into the first mixture as it leaves the motionless mixer/cooler 5, whereupon the combined mixture of $a_1$, $b_2$, $b_3$, and $e_4$ passes into motionless mixer 6. The composition moves into votator A unit 7 (31° C.), then into votator B 8 (21° C.) at which point the process is completed and the product can be packaged. In a preferred process for making a margarine-type process, the ratio of the total of ingredients $a_1+b_2+b_3$ to ingredients $c_4$ and $d_4$ is 94:4:2 parts by weight.

The emulsion-type compositions herein comprise three basic components: (I) an oil phase (oleaginous phase) which is either self-stabilizing or to which is added ingredients which stabilizes the final composition as a W/O emulsion on storage before use; (II) an aqueous phase; and (III) a component which destabilizes the W/O emulsion and converts it to an O/W emulsion during usage of the composition.

The disclosures hereinafter regarding the best mode for manufacturing the compositions of the present invention are not intended to be limiting. It will be appreciated by those skilled in the formulation of foods, drugs and cosmetics that variations in processing conditions can be tolerated without departing from the scope and spirit of this invention. Both preferred and typical operating ranges are included in the following description, with the typical ranges being presented in parentheses to distinguish them from the preferred operating conditions specified.

The practice of the present invention is best illustrated by a detailed description of the manufacture of a preferred margarine-type product. The handling of the separate ingredients which make up the components of the compositions is as follows.

Ingredient (a1): A blend of the following vegetable oils is heated to ca. 66° C. (60° C.–104° C.)

Crisco$^R$ oil: 60 parts (0–98, preferably 40–83)
Hardened coconut oil: 35 parts (0–98, preferably 15–50)
Fully hardened high erucic rapeseed oil: 5 parts (2–10)

Separately, a 3:1 (1:4 to 4:1) mixture of stearic acid:-calcium stearate is heated to ca. 82° C.–93° C. (77° C.–104° C.) to achieve solution of the calcium stearate. This mixture provides high range thermal stability to the W/O emulsion.

The 96 parts of hot vegetable oils are added to 4 parts (90/10 to 98/2) of the hot stearic acid/calcium stearate solution and mixed in an Eppenbach mixer. This blend is allowed to cool to ca. 43° C. (30° C.–50° C.). Oil-soluble butter flavor and coloring are added and 40 parts (20 to 95) of the total blend are charged to the interfacial reactor feed tank (a1).

Ingredient (b2): 55 parts (10 to 80) of a 1.5% (0.5% to 4.5%) solution of Na alginate in a 3.0% (0–5%) aqueous NaCl solution are prepared, heated to ca. 29° C. (21° C.–49° C.) and charged to the interfacial reactor feed tank (b2).

Ingredient (b3): 5 parts (1 to 15) of a 1.0% (0.1% to 4%) aqueous solution of CaCl$_2$ prepared at room temperature (16° C. to 32° C.) are charged to the interfacial reactor feed tank (b3).

Ingredient (e4): Ingredient (e4) is a low shear mixing blend of two constituents, separately prepared as follows.

The first constituent of Ingredient (e4) is the encapsulated emulsion destabilizing agent (c4). The destabilizing agent is prepared by blending, at ca. 40° C. (32° C.–49° C.), 20 parts (10–30) of 10% (5–20%) aqueous solution of gum arabic at pH 9.0 (6–10) with 20 parts (10–30) of 10% (5–20%) aqueous solution of gelatin at pH 9.0 (pH 6–10). Admixed to this in an Eppenbach mixer are 30 parts (10–50) of the following oil phase at ca. 38° C. (27° C.–49° C.) containing the O/W emulsifier (Tween$^R$ 60).

Crisco$^R$ oil: 20 parts (0–90)
Hardened coconut oil: 25 parts (0–90)
Diacetin fat*: 35 parts (0–50)
Tween 60: 20 parts (5–50)
* (Acetylated distilled monoglyceride)

Mixing is as short as possible consistent with formation of 1–3μ (0.1–15μ) droplets (<30 seconds). 85% (10–100%) lactic acid is added with continued mixing to adjust the pH downward to 4.5 (pH 3.5–5.5). This step is immediately followed by adding 30 parts (0–100) of pulverized ice (while mixing) to quickly solidify the oil phase and establish the gelatin/gum arabic mixture around the oil droplets containing the Tween.

The second constituent (which is optional, but preferred in foods, especially margarines) of ingredient (e4) is the aqueous flavor phase (d4), for example dairy cream.

Ingredient (e4) preferably comprises a 4:2 mixture, i.e., 4 parts of first constituent:2 parts second constituent (range 4:0 to 1:5).

Ingredients (a1), (b2) and (b3) are admixed in a multi-concentric stream interfacial reactor (IFR; described hereinabove) whose innermost stream diameter is ca. 0.4 mm (0.1–4.0 mm). This feeds a high shear mixing head and is (optionally) followed by a commercial homogenizer (#3 in the Figure) with a recycle loop, (#2 in the Figure; Recycle surge tank/cooler). A portion of the mixture of (a1), (b2), (b3) equal to the output of the IFR (#1) in the Figure is allowed to flow from the recycle loop into the pressure relief/surge tank (#4). This mixture of (a1), (b2), and (b3) is cooled to ca. 27° C. in a jacketed in-line static mixing pipe (#5 in the Figure) or optionally the product could be chilled in a conventional votator type unit. Ingredients (c4) and (d4) are mixed together and result in ingredient (e4). Ingredient (e4) is added to the main product stream and passed through an in-line motionless mixer pipe (#6 in the Figure). The product is cooled in a votator type, scraped wall heat exchanger (#7 in the Figure) to 18° C. (10°–22° C.). Optionally the final composition can be passed through a votator B type unit (#8 in the Figure) prior to packing.

Examples of margarine compositions, with and without lecithin and monoglyceride in ingredient (a1), prepared in the foregoing manner are as follows. In Examples I and II, ingredient numbers (a1), (b2), (b3), (c4) and (d4) correspond to the above processing description.

EXAMPLE I

| Ingredient Number | Ingredient | Grams | % of Total Composition |
| --- | --- | --- | --- |
| (a1) | Crisco$^R$ oil | 2713.2 | 19.38 |
| | Hardened coconut oil | 1776.6 | 12.69 |
| | Hardened high erucic rapeseed oil | 246.4 | 1.76 |
| | Stearic acid | 112.0 | 0.80 |
| | Calcium stearate | 37.8 | 0.27 |
| | Monoolein (90% mono) | 39.2 | 0.28 |
| | Lecithin (60% active) | 9.8 | 0.07 |
| | Color | As desired | As desired |
| | Flavor | As desired | As desired |
| (b2) | Water | 7413.0 | 52.95 |
| | Sodium alginate | 116.2 | .83 |
| | Salt | 235.2 | 1.68 |
| (b3) | Water | 453.6 | 3.24 |
| | CaCl$_2$.H$_2$O | 7.0 | 0.05 |
| (c4) | Water | 369.6 | 2.64 |
| | Gelatin | 11.2 | 0.08 |
| | Gum arabic | 11.2 | 0.08 |
| | Crisco$^R$ oil | 33.6 | 0.24 |
| | Hardened coconut oil | 42.0 | 0.30 |
| | Diacetin fat | 58.8 | 0.42 |
| | Tween 60 | 33.6 | 0.24 |
| (d4) | Whipping cream | 280.0 | 2.0 |

The superior thermal stability of the composition of Example I as compared with butter was demonstrated by measuring product slump, over time, at various temperatures. The comparative data are as follows:

THERMAL STABILITY

| TEMPER- A-TURE | BUTTER | | | EXAMPLE I COMPOSITION | | |
|---|---|---|---|---|---|---|
| | HRS. | SLUMP GRADE | COMMENT | HRS. | SLUMP GRADE | COMMENT |
| 32° C. | 1 | 2 | Oil bleed | 1 | 8 | No Oil bleed |
| 38° C. | — | 0 | Melted | 23 | 6 | No Oil Bleed |
| 43° C. | — | 0 | Melted | 48+ | 6 | No Oil Bleed |
| | 1 Hrs. | | Oil bleed | 72+ Hrs. | | No Oil Bleed |

EXAMPLE II

| Ingredient Number | Ingredient | Grams |
|---|---|---|
| (a1) | Crisco$^R$ oil | 2378.6 |
| | Hardened coconut oil | 1556.8 |
| | Fully hardened high erucic rapeseed oil | 215.6 |
| | Calcium stearate | 32.2 |
| | Stearic acid | 128.8 |
| | Flavor | As desired |
| | Color | As desired |
| (b2) | Water | 7050.0 |
| | Sodium alginate | 112.0 |
| | Salt | 230.0 |
| (b3) | Water | 609.8 |
| | Calcium chloride dihydrate | 6.2 |
| (c4) | Water | 369.6 |
| | Gelatin | 11.2 |
| | Gum arabic | 11.2 |
| | Crisco$^R$ oil | 33.6 |
| | Hardened coconut oil | 42.0 |
| | Diacetin fat (Myvacet 700) | 58.8 |
| | Tween 60 | 33.6 |
| (d4) | Whipping cream | 280.0 |

EXAMPLE III

A bench-scale or semi-works margarine process is as follows.

Component (I). A blend of 58.0% Crisco$^R$ oil, 36.0% hardened coconut oil, 5.0% fully hardened high erucic rapeseed oil, 0.8% monoolein, 0.2% lecithin and color and flavor as desired is heated to a temperature of about 66° C. Separately, a mixture of about 1 part by weight calcium stearate and about 2 parts by weight fatty acid is heated to a temperature of about 71° C. to dissolve the calcium stearate. The calcium stearate-plus-fatty acid mixture (which serves as a high temperature W/O stabilizing ingredient for the liquid Crisco$^R$ oil) is added to the hot oil phase as prepared above at a weight ratio of said mixture:oil phase of about 2:98. Optionally, at this stage of the process the hot composition can be kept warm or allowed to cool to about 32° C. An oil-soluble butter flavor is then added to the overall mixture of oil phase/calcium stearate/fatty acid, according to the flavor level desired by the formulator. This portion of the composition is introduced into a commercial high shear mixer (Eppenbach mixer).

Component (II). An aqueous phase comprising a calcium alginate gel (viscosity greater than about 10,000 cps) is prepared, fragmented by mixing and introduced into the Eppenbach mixer at a temperature of about 30° C. with the butter-flavored oil phase prepared above. Salt, to taste, is conveniently added at this point with the gel. The ratio of oil phase:gelled water phase is in the range of from about 30:70 to about 60:40. The Eppenbach mixer is operated for a time of about 5 minutes per kg. of the mixture of oil phase/gelled water phase.

Natural dairy cream (temperature in the range of 10° C.-25° C.) is added to the thoroughly mixed composition stream. The addition of cream is optional, but the protein solids in the cream contribute importantly to the proper "browning" of the final product when it is used in frying and other cooking operations, in the manner of natural butter. The cream usually comprises from about 1% to about 3% of the total final composition.

The composition stream with added cream is then passed twice through a standard, commercial homogenizer at a temperature in the range of from about 27° C. to about 32° C. The homogenizer provides very high shear mixing, whereupon the components are thoroughly mixed and the aqueous gel is homogeneously distributed as small particles (preferably 1 to 10 microns) throughout the composition.

Component (III). A typical and convenient immobilized water-in-oil emulsion destabilizing agent used in the present compositions is prepared by admixing 35 parts of a 10% gelatin solution at a pH of about 9.0 with 30 parts of a 50:50 (wt.) mixture of hydrophilic emulsifier (especially Tween 60 ®) in an oil (e.g., Crisco ® oil). The mixture is maintained at a temperature of about 54° C., and 35 parts of an anionic colloidal solution of 10% gum arabic (pH 9.0) is added. This final mixture is maintained at about 54° C. and diluted to about 2 times its original volume with water. The diluted mixture is then acidified to a pH of about 4.5 with 85% lactic acid and cooled to about 14° C. Excess water is removed by filtration. The final water-in-oil emulsion destabilizing agent comprises encapsulated droplets of the mixture of Tween ® emulsifier and Crisco ® oil in the form of coated particles or "beads" having an average diameter in the range from about 0.1 micron to about 3 microns.

Final Mixing. After homogenization, the immobilized water-in-oil emulsion destabilizing agent is added to the oil/aqueous gel composition. The total amount of the destabilizing agent can vary with the desires of the formulator as to the "melting" properties of the final product; a concentration of about 6% destabilizer yields a product with butter-like "melting" properties. The final composition is again passed once or twice through the homogenizer at a temperature in the range of 27° C.-32° C. to yield the final product. The final product is cooled in the range of 18° C.-20° C. and packaged for use.

INDUSTRIAL APPLICABILITY

Food compositions according to the present invention comprise, as the oil phase, edible fats or oils selected from the group consisting of vegetable-derived fats and oils and animal-derived fats and oils. Preferably, the edible, digestible oil phase is an unhydrogenated, partially hydrogenated or hydrogenated, edible oil selected from the group consisting of soybean oil, coconut oil, palm oil, cottonseed oil, fractionated tallow oil, rapeseed oil, sunflower seed oil, safflower oil, and mixtures thereof. Other fats and oils useful herein include tallow, lard, babassu oil, corn oil, and the like.

Compositions according to the present invention can also comprise, as the oil phase, ingestible, non-absorbable, non-digestible oleaginous materials, especially the non-absorbable, non-digestible fatty acid esters of polyol compounds, especially the sugar esters, as described more fully hereinafter. Such compositions can contain various anti-anal leakage agents, fat-soluble vitamins, and the like, as disclosed in the Mattson and Jandacek series of U.S. patents, cited above. Such compositions are useful as low- or non-calorie foods. Most importantly, such compositions can be used to lower blood cholesterol levels in humans and lower animals.

Typical non-absorbable, non-digestible fatty acid esters of polyol compounds useful in such low calorie and anti-hypercholesterolemic compositions include the $C_8$–$C_{22}$ carboxylic esters of sugars such as xylose, arabinose, maltose, lactose and sucrose (preferred). For example, the sucrose octaesters of fatty acids such as caprylic, capric, lauric, myristic, myristoleic, palmitic, palmitoleic, stearic, oleic, ricinoleic, linoleic, linolenic, eleostearic, arachidic, arachidonic, behenic, and erucic acid are useful as the oil phase in anti-hypercholesterolemic compositions. (See U.S. Pat. No. 4,005,196.) Sucrose hexaoleate, sucrose heptaoleate and sucrose octaoleate, and mixtures thereof, are preferred; sucrose octaoleate is especially preferred.

Such non-absorbable, non-digestible polyol fatty acid polyesters suitable for use herein can be prepared by a variety of methods well known to those skilled in the art. These methods include: transesterification of the polyol with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. For example, the preparation of polyol fatty acid esters is described in U.S. Pat. No. 2,831,854 and a preferred method is described in U.S. Pat. No. 3,963,699 (1976; Rizzi and Taylor) both incorporated herein by reference.

As disclosed in detail in U.S. Pat. No. 4,005,196, the ingestion of the non-absorbable, non-digestible polyol esters can interfere with the body's stores of fat-soluble vitamins. To alleviate this situation, compositions containing said polyol esters can optionally be fortified with vitamins A, D, E and K at levels sufficient to provide an appropriate daily allowance of such vitamins. Alternatively, the user of such compositions can ingest commercial vitamin supplements containing said fat-soluble vitamins.

Also as disclosed in U.S. Pat. No. 4,005,196, the non-absorbable, non-digestible polyol esters can pass the anal sphincter. Anti-anal leakage agents ("AAL") overcome this problem. Typical AAL agents include or sources of fatty acids, or fatty acids per se. Non-limiting examples of AAL agents include hydrogenated palm oil (preferred), the $C_{12}$–$C_{24}$ saturated fatty acid esters of monohydric alcohols such as methyl, ethyl, and propyl alcohols (preferably ethyl alcohol), esters of dihydric alcohols such as 1,2-propanediol, 1,3-butanediol, and the like, and fatty triglycerides.

Thus, the non-absorbable, non-digestible polyol esters (especially sucrose octaolate) can comprise the whole of the oleaginous phase of the present compositions, or can be used in combination with an AAL as the oleaginous phase. As disclosed in U.S. Pat. No. 4,005,196, the AAL agent will typically be present in an amount which comprises from about 10% to about 50% by weight of the non-absorbable polyol ester to provide the desired AAL result.

Compositions of the present type can also comprise, as the oil phase, various non-edible "oily", "fatty" or "waxy" materials. While such compositions are not generally recommended for ingestion, they are useful as skin emollients and as carriers for drug agents, cosmetic agents and the like. Examples of materials useful as the oil phase in such compositions include, for example, the silicone fluids, fluorocarbon liquids, and the like. Such compositions comprising mineral oil as the oil phase can be used topically (e.g., for emolliency) or orally (e.g., laxative).

Those compositions herein which comprise a liquid oil phase contain, as a water-in-oil emulsion stabilizing agent in the liquid oil, a solid oleophilic material, or even inorganic solids, said inorganic solids having a particle size less than about 1 micron.

Such oleophilic emulsion stabilizing agents include, for example, members selected from the group consisting of solid mono-, di- and tri-glycerides, solid propylene glycol mono- and di-esters of fatty acids, solid fatty alcohols, solid synthetic waxes, solid fatty acid soaps, solid combinations of fatty acids with solid fatty acid soaps, solid hydrophobic proteins, and mixtures thereof.

Inorganic emulsion stabilizers include various (preferably inert) relatively insoluble inorganic salts, including zinc oxide, barium sulfate, magnesium oxide, aluminum oxide, calcium oxide, silicates, and the like.

Preferred emulsion stabilizing agents are selected from blends of fatty acids with calcium, aluminum, zinc or magnesium, stearate soaps at a weight ratio of stearate soap:fatty acid in the range from about 1.5:1 to about 1:4.

In preferred compositions the water-in-oil emulsion stabilizing agent in the oil phase is cross-linked to components in the aqueous phase. For example, polyvalent metal cations can be used to establish, chemically, cross-links between alkali metal salts of carboxylic acids present both in the stabilizing agent contained in the oil phase and in components of the aqueous phase. More particularly, when the stabilizing agent in the oil phase is an alkali metal soap of a fatty acid, e.g., a fatty acid soap, including "lactolated," "citrated" or "tartrated" soaps, (adding lactic, tartaric or citric acid to the soap reduces the "soapy" taste) and the alkali metal salt of the carboxylic acid present in the aqueous phase is, for example, an alkali metal alginate or an alkali metal pectinate (each of which have carboxylate groups in their molecular structures) the addition of polyvalent metal cations (e.g., calcium, aluminum, magnesium, zinc, iron, barium, and nickel cations, and mixtures thereof) to the composition effectively forms metal cation cross-links between the fatty acid stabilizer and the alginate or pectinate.

The gelling agents which can be used in the practice of the invention to immobilize the aqueous phase (which phase can comprise from about 5% to about 75% of the present emulsion compositions) can be any of the well-known, commercially-available, thermally-set gelling agents or chemically-set gelling agents. The thermally-set gelling agents are somewhat easier to work with than the chemically-set agents, but leave a gummy frying pan residue when products of the present type are used for high temperature cooking. In contrast, the chemically-set gelling agents do not leave a gummy frying pan residue and are thus preferred in margarine-type compositions for this reason.

Representative examples of thermally- and chemically-set gelling agents suitable for use in the aqueous phase of the present compositions are described in standard texts: see, for example INDUSTRIAL GUMS, Whistler, Academic Press (1959) the disclosures of which are incorporated herein by reference. Typical examples of such gelling agents useful herein include the guar gums, xanthan gums, locust bean gum, agar, low methoxyl pectin, sodium alginates, gelatin, propylene glycol alginate, various dextrans, corn hull gum, seaweed extracts, and the like.

As noted, a preferred gelled aqueous disperse phase comprises a chemically-set gelling agent, and the gelled phase is most preferably in the form of discrete gel droplets having an average particle size in the range from about 1 micron to about 30 microns, said gel droplets being substantially homogeneously distributed throughout the composition. Ingestible alginates, especially the sodium alginates, are preferred for this use. Such alginates are chemically set by well-known means, especially by simply adding polyvalent metal cations (e.g., $Ca^{++}$, $Mg^{++}$, $Al^{+3}$, $B^{+3}$, $Zn^{+2}$, $Fe^{+2}$, $Fe^{+3}$, $Ba^{+2}$, $Ni^{+2}$, etc.) to the composition. As noted above, these cations also perform a cross-linking action with carboxylate emulsion stabilizers, in the oil phase.

The emulsion-destabilizing agent used herein comprises a surfactant (especially a nonionic or anionic surfactant) preferably having an HLB of at least about 12, and above. When the compositions herein are to be used as foods or drugs, it is convenient to select surfactants which are known to be acceptable for ingestion by humans and lower animals. A great number of such toxicologically-acceptable materials are described in the food arts, and many such surfactants are of the general nonionic class. Commercial sources of such materials are well-known. For example, the polysorbate materials, especially the sorbitan oleate, stearate and laurate polyethylene oxides available as "Tweens" ®, are suitable for use herein. Such materials include Tween 20, Tween 60 and Tween 80. Other nonionic surfactants useful herein comprise the ethylene oxide condensates with primary and secondary alcohols, including the "Tergitols" ®, the "Neodols" ®, and the like. Other surfactant types useful herein include the anionics such as the alkyl benzene sulfates and sulfonates, alkyl sulfates, and the like, all of which are well known in the detergency arts and are commercially available. While these latter surfactants are not generally used in foods and drugs, they are quite acceptable for use in cosmetic-type products made in accordance with the present invention.

Typical destabilizing agents herein are selected from the group consisting of polyglycerol esters of fatty acids, polyoxyethylene sorbitan esters of fatty acids, sorbitan esters of fatty acids, alkali metal soaps, linear alkyl sulfates, citrated esters of monoglycerides or alkali metal salts thereof, lactolated esters of monoglycerides or alkali metal salts thereof, tartrated esters of monoglycerides or alkali metal salts thereof, diacetyl tartaric acid esters of distilled monoglycerides or alkali metal salts thereof, fumarated esters of monoglycerides or alkali metal salts thereof, ethoxylated mono- and diglycerides, alkyl phospholipids, succinic acid or alkali metal succinates, alkyl sulfosuccinates, lecithins, and mixtures thereof, which, alone or in admixture, have HLB of at least about 12.

Most preferably, the destabilizing agent in a surfactant selected from the group consisting of polyglycerol esters, polysorbate esters, soaps, alkyl sulfates, alkanoyl lactolates, and mixtures thereof, said destabilizing agent having an HLB of at least about 12.

The present compositions preferably employ the destabilizing agent as a component of an oil phase which is encapsulated. Said encapsulated oil phase most preferably comprises a member selected from the group consisting of liquid or solid animal or vegetable triglycerides and mixtures thereof, and liquid or solid diacetylated monoglycerides and mixtures thereof, liquid or solid monoglycerides and mixtures thereof, or mixtures of said triglycerides, monoglycerides and said diacetylated monoglycerides, although other oils can be used, according to the desires of the formulator. The encapsulating agent for the destabilizing agent is preferably a complex coacervated colloid, e.g., gelatin plus any of the members selected from the group consisting of gum arabic, alkali metal alginates, agar, locust bean gum, pectin, xanthan gum, carrageenan gum, guar gum, and mixtures thereof.

The destabilizing agent can also be used in the form of a high viscosity or solid particle which is immiscible in oil phase (I), for example, surfactants such as sodium lauryl sulfate, sodium alkyl benzene sulfonate, sodium alkyl sulfate, alkali metal soaps of fatty acids, and mixtures thereof.

The following examples further illustrate the practice of this invention. In Examples IV and V, the alginate gel (b2) is prepared in the presence of citrate ("citrated") or tartrate ("tartrated") metal chelator and a metal cation. Addition of acidified (b3) releases the metal cation from the pH-sensitive citrate or tartrate metal chelate. This procedure provides more complete gelation, improves gel droplet stability and reduces the particle size of the aqueous droplet to well within the preferred droplet size range disclosed herein. In Example VI, the presence of the aluminum salt in ingredient (b3) helps cross-link the alginate (b2) with carboxylate ingredients present in the oil phase, also as disclosed hereinabove. It will be appreciated that other pH-sensitive chelators (e.g., EHDP; nitrilotriacetates; amino acids, maleates, gluconates, etc.) other acids (e.g., $H_3PO_4$, lactic acid, ascorbic acid, acetic acid, HCl, adipic acid, etc.) and other metal cations (e.g., those mentioned above, preferably $Ca^{+2}$, $Mg^{+2}$, and $Al^{+3}$) can be used in like manner.

EXAMPLE IV

The margarine of Example I is modified in ingredients b2 and b3, as follows.

|    | Ingredient | % of Total Composition |
|----|---|---|
| b2 | Water | 54.27 |
|    | Sodium alginate | 0.83 |
|    | Sodium Citrate.$2H_2O$ | 0.5192 |
|    | $CaCl_2.2H_2O$ | 0.0519 |
| b3 | Water | 2.772 |
|    | Lactic acid | 0.308 |

EXAMPLE V

The margarine of Example V is prepared in the manner of Example I or IV, with the following modifications in ingredients b2 and b3.

| | Ingredient | % of Total Composition |
|---|---|---|
| b2 | Water | 54.06 |
| | Sodium alginate | 0.83 |
| | AlK(SO₄)₂ | 0.5192 |
| | Sodium tartrate | 0.2596 |
| b3 | Water | |
| | Lactic acid | 0.308 |

EXAMPLE VI

The composition of Example VI is the same as Example V, except for the ingredient b3.

| | Ingredient | % of Total Composition |
|---|---|---|
| b3 | Water | 2.7658 |
| | Lactic acid | 0.3080 |
| | AlK(SO₄)₂·12H₂O | 0.0062 |

The foregoing examples have illustrated emulsion-type compositions comprising an oil phase, a disperse phase, and the emulsion-distabilizing agent. However, surprisingly palatable, non-waxy, non-greasy shortening-type compositions can be prepared by simply combining a fatty material and the emulsion-destabilizing agent. In use, such compositions combine with extrinsic water (e.g., saliva, perspiration) and "pseudo-melt" in the manner of the emulsion-type compositions of Examples I through VI. The following examples further illustrate this aspect of the present invention.

EXAMPLE VII

| Ingredient | % of Total Composition |
|---|---|
| Crisco$^R$ shortening | 90 |
| Destabilizer* | 10 |
| Flavor and color | As desired |

*Tween 60 coacervate (c4) per Example I

The composition of Example VII is prepared by blending the ingredients in a Waring blender and is ready for typical use as a shortening, e.g., in the preparation of pie crusts, or for food frying.

The composition of Example VII is modified by adjusting the total amount of coacervated Tween 60 to ca. 0.4% to provide a shortening composition suitable for baking usage.

The foregoing examples have illustrated typical uses of the present compositions as foods, or the like. The following examples illustrate other uses and variations of the present invention, but are not intended to be limiting thereof.

EXAMPLE VIII

An antihypercholesterolemic composition is as follows:

| Ingredient | % of Total Composition |
|---|---|
| Sucrose octaoleate | 60 |
| Hydrogenated palm oil | 30 |
| Destabilizer* | 10 |

*Tween 60 coacervate (c4) per Example I.

The composition of Example VIII is prepared by simply blending the ingredients. The composition is used in the manner of Mattson, et al. (cited references, above) to control cholesterol levels in a patient in need of such treatment.

EXAMPLE IX

A topical analgesic composition is prepared by blending the following ingredients.

| Ingredient | % of Total Composition |
|---|---|
| Emulsion base* | 95 |
| Acetylsalicylic acid | 5 |

*The composition of Example I, above.

The composition of Example IX is prepared by blending the ingredients. When applied topically to the skin of a human or lower animal to provide an analgesic effect. The emulsion base is non-waxy, tactilely pleasant, and "pseudo melts" with rubbing.

EXAMPLE X

A cosmetic vehicle suitable for application to human skin is prepared in the manner of Example I or II by replacing the liquid triglyceride oils of ingredients (a1) and (d4) with an equivalent amount of cosmetic-grade polydimethylsilicone oil.

EXAMPLE XI

A hand cream formulation is prepared in the manner of Example I.

| | | Phase % | % of Total Composition |
|---|---|---|---|
| (a1) | Liquid vegetable oil | 60.0 | 21.0 |
| | Cocoa butter | 30.0 | 10.5 |
| | Cetyl alcohol | 6.3 | 2.2 |
| | Palm hardstock | 3.0 | 1.0 |
| | Lecithin | 0.5 | 0.2 |
| | Monoolein | 0.25 | 0.1 |
| | Color | — | — |
| | Fragrance | — | — |
| (b2) | Water | 88.5 | 35.4 |
| | Glycerine | 10.0 | 4.0 |
| | Na alginate | 1.5 | 0.6 |
| (b3) | Water | 99.0 | 4.95 |
| | CaCl₂·2H₂O | 1.0 | .05 |
| (c4) | Liquid vegetable oil | 89.0 | 17.8 |
| | Cocoa butter | 10.0 | 6.0 |
| | Pulverized sodium stearoyl-2-lactylate | 1.0 | 0.2 |

EXAMPLE XII

An oleaginous composition suitable for use as a cosmetic or drug-carrying vehicle is as follows.

| | % Total Composition |
|---|---|
| (a1) Crisco$^R$ oil | 19.38 |
| Hardened coconut oil | 12.69 |
| Fully hardened high erucic rapeseed oil (optional) | 1.76 |
| Na stearate | 0.27 |
| Stearic acid | 0.80 |
| Monoolein | 0.28 |
| Lecithin | 0.07 |
| Color | as desired |
| Flavor | as desired |

Components (b2) and (b3) can be those of Examples I, IV, V, VI or any combinations of those aqueous materials.

The composition of Example XII is prepared in the manner of Example I.

As can be seen from the foregoing, the present compositions comprising from about 1% to about 20% (preferably 5% to about 10%) by weight of an emulsion destabilizing agent pseudo-melt, and thereby closely mimic the melting properties of natural butter, or the like.

What is claimed is:

1. A composition of matter in the form of a water-in-oil emulsion, which comprises:
    (a) from about 25% to about 95% by weight of said composition of a first oil phase selected from the group consisting of:
        (i) solid fats and solidified oils; and
        (ii) liquid oils containing at least about 0.5% by weight of said liquid oil of a water-in-oil emulsion stabilizing agent;
    said first oil phase having substantially homogeneously distributed therethrough;
    (b) from about 5% to about 75% by weight of said composition of an aqueous disperse phase;
    (c) said composition having dispersed therethrough an effective amount of particles comprising a water-in-oil emulsion destabilizing surfactant in a passive state having an hydrophilic-lipophilic balance greater than about 6, said particles being in the form of encapsulated droplets of a second oil phase having said destabilizing surfactant as a component thereof;
    (d) said destabilizing surfactant being capable of inverting said composition to an oil-in-water emulsion when released from said particles.

2. A food composition according to claim 1 wherein the first oil phase comprises edible fats or oils selected from the group consisting of vegetable-derived fats and oils and animal-derived fats and oils.

3. A food composition according to claim 2 wherein the first oil phase is an unhydrogenated, partially hydrogenated or hydrogenated edible oil selected from the group consisting of soybean oil, coconut oil, palm oil, cottonseed oil, fractionated tallow oil, rapeseed oil, sunflower seed oil, safflower oil, and mixtures thereof.

4. A composition according to claim 1 wherein the encapsulated oil phase comprises a member selected from the group consisting of liquid or solid animal or vegetable triglycerides and mixtures thereof, and liquid or solid diacetylated monoglycerides and mixtures thereof, and liquid or solid monoglycerides and mixtures thereof, or mixtures of said triglycerides, said diacetylated monoglycerides, and said monoglycerides.

5. A composition according to claim 1 wherein the aqueous disperse phase is in the form of gel droplets distributed substantially homogeneously throughout said composition.

6. A food composition according to claim 1 wherein the first oil phase is a non-absorbable, non-digestible fatty acid ester of a polyol compound.

7. A food composition according to claim 6 wherein the fatty acid ester of the polyol compound is selected from sucrose hexaoleate, sucrose heptaoleate, sucrose octaoleate, and mixtures thereof.

8. A composition according to claim 1 wherein the water-in-oil emulsion stabilizing agent in the liquid oil is a solid oleophilic material.

9. A composition according to claim 8 wherein the emulsion stabilizing agent is a member selected from the group consisting of solid mono-, di- and tri-glycerides, solid propylene glycol mono- and di-esters of fatty acids, solid fatty alcohols, solid synthetic waxes, solid fatty acid soaps, solid combinations of fatty acids with solid fatty acid soaps, solid hydrophobic proteins, and mixtures thereof.

10. A composition according to claim 9 wherein the emulsion stabilizing agent is selected from blends of fatty acids with calcium, aluminum, zinc or magnesium stearate soaps at a weight ratio of stearate soap:fatty acid in the range from about 1.5:1 to about 1:4.

11. A composition according to claim 1 wherein the water-in-oil emulsion stabilizing agent is an inorganic solid having a particle size less than about 1 micron.

12. A composition according to claim 1 wherein the water-in-oil emulsion stabilizing agent is cross linked to components in the aqueous phase.

13. A composition according to claim 12 characterized by polyvalent metal cation cross-linking between alkali metal salts of carboxylic acids present both in the emulsion stabilizing agent present in the oil phase and in components of the aqueous phase.

14. A composition according to claim 13 wherein the emulsion stabilizing agent in the oil phase is an alkali metal soap of a fatty acid.

15. A composition according to claim 14 wherein the fatty acid soap is lactolated, citrated or tartrated.

16. A composition according to claim 14 wherein the alkali metal salt of the carboxylic acid present in the aqueous phase is an alkali metal alginate or an alkali metal pectinate.

17. A composition according to claim 13 wherein the polyvalent metal cation cross-linking agent is a member selected from the group consisting of the following cations: calcium, aluminum, magnesium, zinc, iron, barium, nickel, and mixtures thereof.

18. A composition according to claim 5 wherein the gelled aqueous disperse phase comprises a chemically-set gelling agent.

19. A composition according to claim 18 wherein the gelled disperse phase comprises a chemically-set gel in the form of discrete droplets having an average particle size in the range from about 1 micron to about 30 microns, said gel droplets being substantially homogeneously distributed thoughout the composition.

20. A composition according to claim 19 wherein the chemically-set get comprises an ingestible alginate as the gelling agent.

21. A composition according to claim 20 wherein the alginate gelling agent is sodium alginate.

22. A composition according to claim 19 wherein the gelling agent is chemically set with a polyvalent metal cation.

23. A composition according to claim 22 wherein the metal cation is selected from calcium, magnesium, aluminum, zinc, iron, barium and nickel cations, and mixtures thereof.

24. A composition according to claim 1 wherein the destabilizing surfactant is selected from the group consisting of nonionic and anionic surfactants and mixtures thereof.

25. A composition according to claim 24 wherein the destabilizing agent surfactnat is a member selected from the group consisting of polyglycerol esters of fatty acids, polyoxyethylene sorbitan esters of fatty acids, sorbitan esters of fatty acids, alkali metal soaps, linear alkyl sulfates, citrated esters of monoglycerides or alkali metal salts thereof, lactolated esters of monoglycerides or alkali metal salts thereof, tartrated esters of monoglycerides or alkali metal salts thereof, diacetyl tartaric acid esters of distilled monoglycerides or alkali metal salts thereof, fumarated esters of monoglycerides or alkali metal salts thereof, ethoxylated mono- and diglycerides, alkyl phospholipids, succinic acid or alkali metal succinates, alkyl sulfo-succinates, lecithins, and mixtures thereof.

26. A composition according to claim 25 wherein the destabilizing surfactant has an HLB of at least about 12.

27. A composition according to claim 25 wherein the destabilizing surfactant is selected from the group consisting of polyglycerol esters, polysorbate esters, soapw, alkyl sulfates, alkanoyl lactolates, and mixtures thereof, said destabilizing agent having an HLB of at least about 12.

* * * * *